(12) United States Patent
Sullivan

(10) Patent No.: US 6,532,740 B1
(45) Date of Patent: Mar. 18, 2003

(54) GENERATOR EMPLOYING THE CORIOLIS EFFECT

(75) Inventor: Mark A. Sullivan, San Antonio, TX (US)

(73) Assignee: Mindworks Imagineering, Inc., San Antonio, TX (US)

( * ) Notice: Subject to any disclaimer, the term of this patent is extended or adjusted under 35 U.S.C. 154(b) by 0 days.

(21) Appl. No.: 10/012,866

(22) Filed: Nov. 30, 2001

(51) Int. Cl.[7] .................................. F03G 7/02
(52) U.S. Cl. ........................ 60/641.11; 60/641.12; 60/651; 60/671
(58) Field of Search .................. 60/641.8, 641.11, 60/651, 671, 641.12

(56) References Cited

U.S. PATENT DOCUMENTS

| 4,244,189 A | 1/1981 | Bliamptis | 60/641 |
|---|---|---|---|
| 4,442,887 A | 4/1984 | Anderson | 165/85 |
| 4,452,046 A | 6/1984 | Valentin | 60/641.11 |
| 4,497,177 A | 2/1985 | Anderson | 60/641.12 |
| 4,507,916 A | 4/1985 | Anderson | 60/641.1 |
| 4,563,248 A | 1/1986 | Anderson | 203/10 |
| 5,300,817 A | * 4/1994 | Baird | 290/55 |
| 5,395,598 A | 3/1995 | Prueitt | 422/168 |
| 5,588,379 A | * 12/1996 | Witteveen | 110/262 |
| 5,608,268 A | * 3/1997 | Senanayake | 290/54 |

* cited by examiner

*Primary Examiner*—Hoang Nguyen
(74) *Attorney, Agent, or Firm*—Akin, Gump, Strauss, Hauer & Feld, LLP

(57) ABSTRACT

A system for employing the Coriolis effect for the generation and/or storage of energy generally comprises a vortex chamber for rotational acceleration therein of superheated, supersaturated water vapor and heated air and a water intake assembly and an adjustable air intake assembly each in fluid communication with the vortex chamber. The water intake assembly is adapted to deliver a directed flow of superheated water vapor to a lower portion of the vortex chamber while the air intake assembly is adapted to deliver a flow of heated air to the lower portion of said vortex chamber. The air intake assembly comprises an electrical generator operable by airflow drawn from the air intake assembly.

36 Claims, 6 Drawing Sheets

GENERATOR EMPLOYING THE CORIOLIS EFFECT

FIELD OF THE INVENTION

The present invention relates to methods and apparatus for harnessing natural energy sources. More particularly, the invention relates to a generator employing the Coriolis effect for the capture of electrical energy from coastal winds, alluvion and the like as well as for the production of useful co-products, such as clean water, clean air and mineral and organic precipitates.

BACKGROUND OF THE INVENTION

In the past, systems have been envisioned wherein the Coriolis effect of the earth's rotation might be utilized to enhance the spinning movement of air or water vapor within a chamber for the generation of electrical energy. For example, U.S. Pat. No. 4,442,887 issued Apr. 17, 1984 to Anderson ("Anderson") describes a system wherein water contained in a covered basin is solar heated and vaporized. According to Anderson, a condenser may then be utilized to draw vapor from the top of the basin downward and out of the basin. Finally, Anderson discloses that the Coriolis effect may induce a horizontal spin in the water vapor, thereby enabling operation of a plurality of propeller-driven generators located within the covered basin. Anderson fails to appreciate, however, that in order to produce maximized air flows within the covered basin, obstructions to the Coriolis-aligned flows must be minimized. It is therefore an object of the present invention to present a method and apparatus for harnessing the earth's Coriolis effect wherein this natural energy source may be captured with greater efficiency. To this end, it is a specific object of the present invention to present such a system wherein turbines placed outside of and before a vortex chamber may be utilized to capture electrical energy from high-speed air flows into a vortex chamber. Additionally, it is an object of the present invention to present such a system wherein the inlets to such a vortex chamber may be tuned in order to efficiently capture any ambient winds consistent with the generation of high-speed air flows within the vortex chamber.

Previous systems employing the Coriolis effect also apparently fail to appreciate that it may be desirable to store captured energy for later conversion or use. In fact, Applicant knows of no system employing the Coriolis effect that contemplates the conduction of water vapor to a remote, higher elevation site where water condensed from the vapor may be utilized as desired for hydroelectric generation. Applicant knows of no such system wherein the Coriolis effect is utilized in aid of such conduction. Although, as disclosed in U.S. Pat. No. 4,244,189 issued Jan. 13, 1981 to Bliamptis, others have contemplated the use of solar radiation to convey water vapor to a remote site, no specific improvement by others is known by Applicant for increasing the distance over which such conduction may take place. It is therefore another object of the present invention to present a method and apparatus employing the Coriolis effect wherein captured energy may be stored for later conversion. It is a further object of the present invention to present such a system wherein water vapor may be conveyed through conduction tubes to very remote locations. It is yet a further object of the present invention to present such a system wherein the utilized conduction tubes are specifically adapted to prevent condensation en route to the remote location.

Finally, it is a specific object of the present invention to present a method and apparatus for harnessing the Coriolis effect wherein the collection of useful co-products may also be readily maximized. To this end, it is an object of the present invention to enable the production of clean water, clean air and mineral and organic precipitates as the primary co-products of electrical generation.

SUMMARY OF THE INVENTION

In accordance with the foregoing objects, the present invention in one embodiment generally comprises a system for employing the Coriolis effect for the generation of electrical energy, said system having: a vortex chamber for rotational acceleration therein of superheated water vapor and heated air; a water intake assembly in fluid communication with said vortex chamber, said water intake assembly being adapted to deliver a stream of superheated water vapor to a lower portion of said vortex chamber; an air intake assembly in fluid communication with said vortex chamber, said air intake assembly being adapted to deliver a flow of heated air to said lower portion of said vortex chamber; and wherein said air intake assembly comprises an electrical generator, said electrical generator being operable by airflow drawn from said air intake assembly into said vortex chamber as said stream of superheated water vapor and said flow of heated air are accelerated within said vortex chamber by the Coriolis effect.

In a second embodiment, the present invention generally comprises a system for employing the Coriolis effect for the collection of natural energy, said system having: a vortex chamber for rotational acceleration therein of superheated water vapor and heated air; a water intake assembly in fluid communication with said vortex chamber, said water intake assembly being adapted to deliver a stream of superheated water vapor to a lower portion of said vortex chamber; an air intake assembly in fluid communication with said vortex chamber, said air intake assembly being adapted to deliver a flow of heated air to said lower portion of said vortex chamber; an exit chamber coupled to at least one conduction tube, said exit chamber being located in an upper portion of said vortex chamber; and wherein said exit chamber is adapted to provide a substantially laminar exit from said vortex chamber for the rotationally accelerated superheated water vapor and heated air.

As will be recognized by those of ordinary skill in the art, however, the various features of the first and second embodiments of the present invention may be combined to form a third preferred embodiment wherein energy may be immediately converted into useful form as well as stored for later use. In addition, those of ordinary skill in the art will also recognize that many other aspects of the present invention, as described in detail further herein, may be incorporated as desired into any of the foregoing embodiments in order to maximize the utility of the present invention.

Regardless of the particular embodiment, it will be understood by those skilled in the art that the inventive generator advantageously employs low pressure at many points in the system to efficiently pull air into the system; allow for lower boiling points of water vapor; allow for faster air speeds; and enhance the capture of the Coriolis effect, resulting in a system that has many similarities to a true natural hurricane.

Finally, many other features, objects and advantages of the present invention will be apparent to those of ordinary skill in the relevant arts, especially in light of the foregoing discussions and the following drawings, exemplary detailed description and appended claims.

BRIEF DESCRIPTION OF THE DRAWINGS

Although the scope of the present invention is much broader than any particular embodiment, a detailed description of the preferred embodiment follows together with illustrative figures, wherein like reference numerals refer to like components, and wherein.

DETAILED DESCRIPTION OF THE PREFERRED EMBODIMENT

Figure 1:
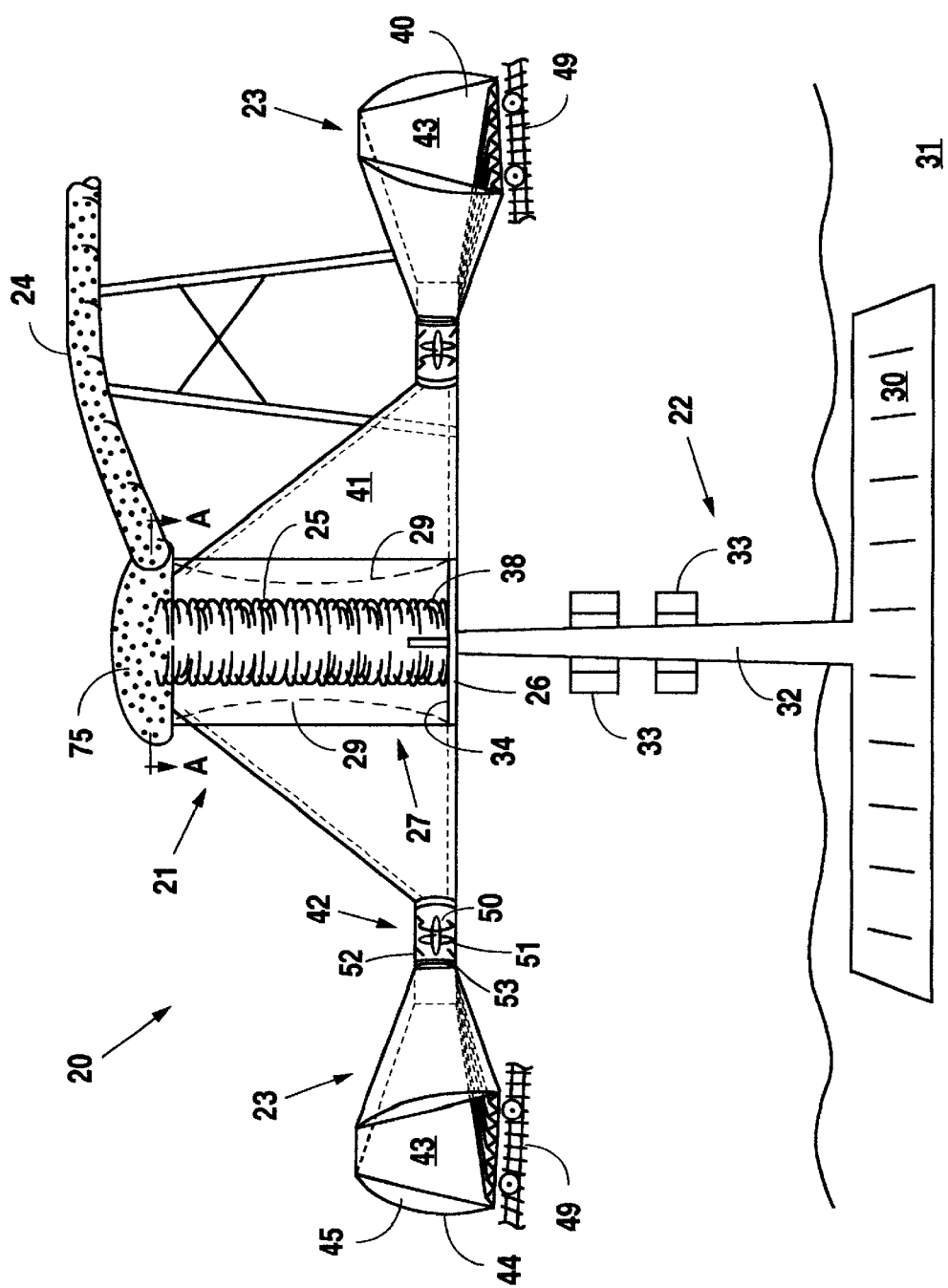
FIG. 1 shows, in a perspective view, the preferred embodiment of the generator of the present invention.

Although those of ordinary skill in the art will readily recognize many alternative embodiments, especially in light of the illustrations provided herein, this detailed description is exemplary of the preferred embodiments of the present invention, the scope of which is limited only by the claims appended hereto.

Referring now to the figures, the generator 20 of the present invention is shown to generally comprise a vortex chamber 21 in fluid communication with a water intake assembly 22, an air intake assembly 23 and one or more conduction tubes 24. As will be better understood further herein, the generator 20 is adapted to harness the earth's Coriolis effect to produce a hurricane-like vortex 25, thereby converting this natural source of energy into a usable form. To this end, water and air are drawn into the vortex chamber 21, through the water intake assembly 22 and the air intake assembly 23, respectively, in a manner designed to impart a counterclockwise spin (in the northern hemisphere) to the resultant air and water mixture, thereby ensuring efficient capture of Coriolis energy. To facilitate the formation of the desired controlled vortex 25, the water is vaporized as it is introduced to the chamber 21. Likewise, the air is super-heated before and during introduction to the chamber to impart increased energy to the mixture, thereby intensifying the angular momentum of the vortex 25. As will be better understood further herein, the energy captured through the creation of this vortex 25, which exhibits hurricane-like qualities, may then be extracted locally or, by conveyance through one or more of the conduction tubes 24, at one or more distant sites. Additionally, as also will be better understood further herein, many useful co-products, such as clean air, clean freshwater and valuable mineral and organic precipitates, may be produced and collected through implementation of the teachings of the present invention. The ability of the generator to super-heat water and induce precipitation also makes the generator useful for wastewater treatment, producing relatively cleaner water and by-products of sludge or toxic waste.

Figure 2:
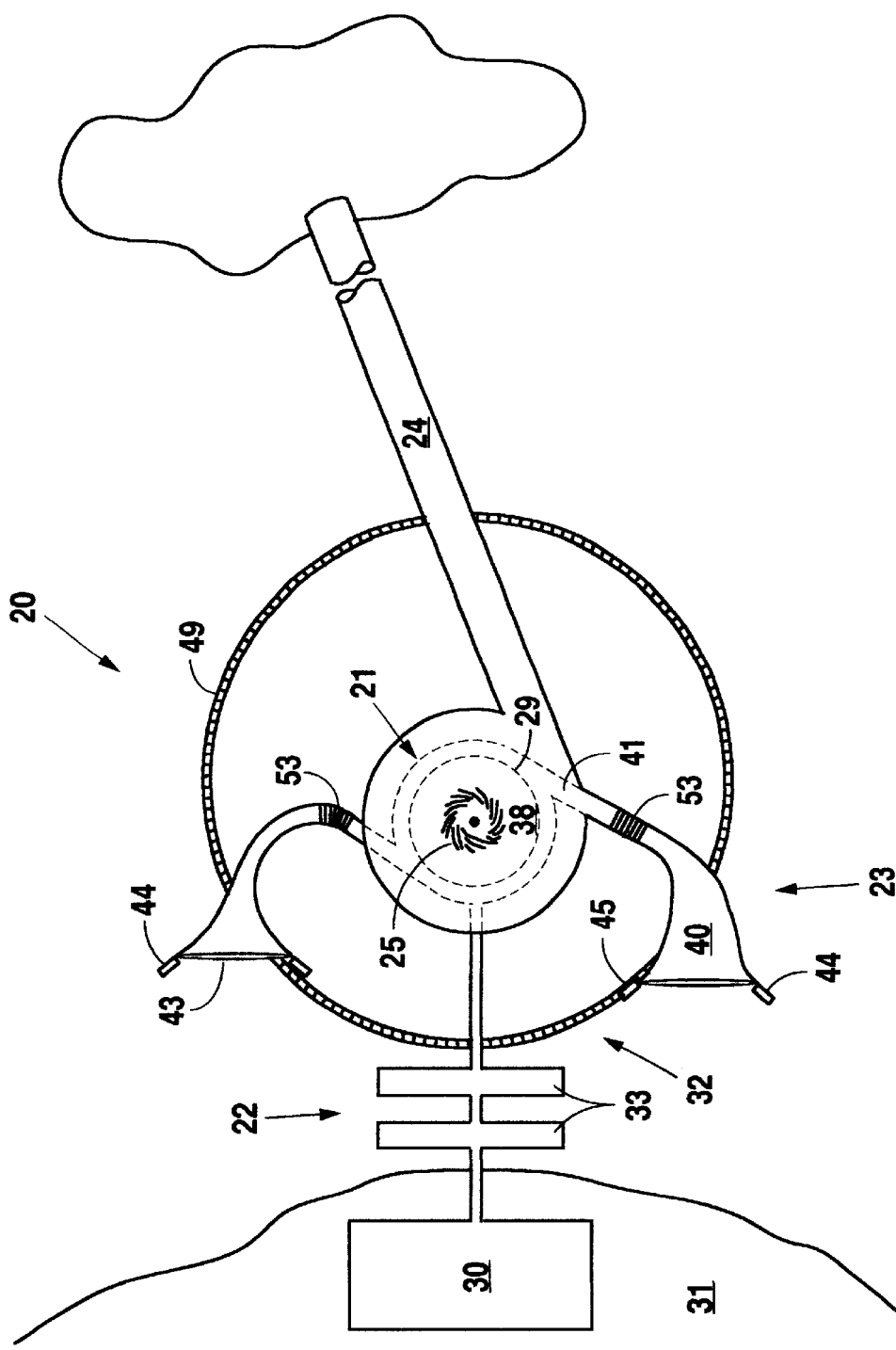
FIG. 2 shows, in a sectional plan view taken along section A—A of FIG. 1, the generator and a reservoir to which freshwater produced by the generator may be conveyed.
Figure 3:
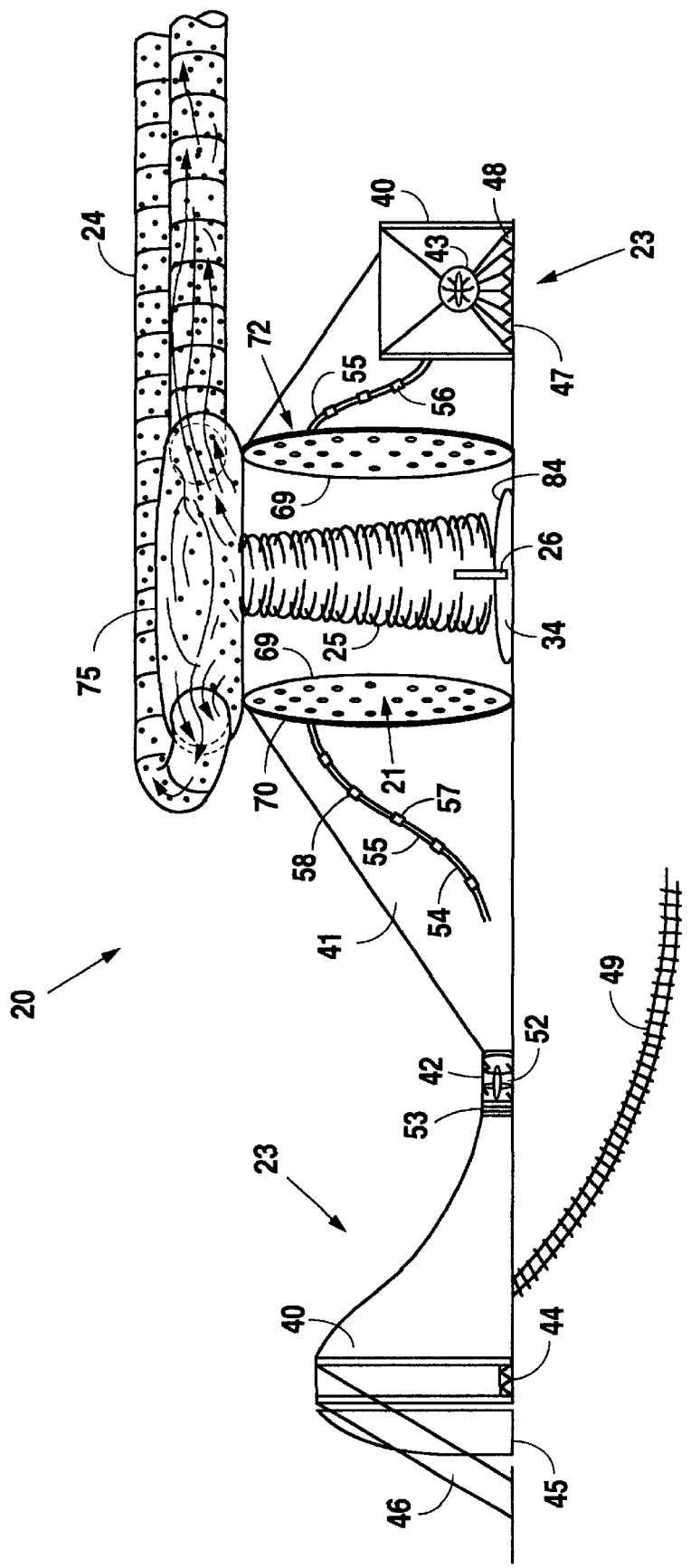
FIG. 3 shows, in a partial perspective view, the generator of FIG. 1, including in particular details of the generator's air intake assembly and vortex chamber.

As particularly shown in FIGS. 1 through 3, the water intake assembly 22 generally terminates at a boiler tower 26 centrally located within the lower portion 27 of the vortex chamber 21. As will be detailed further herein, the boiler tower 26 comprises a plurality of apertures 28 into the vortex chamber 21 for the delivery thereto of superheated water vapor. As will be appreciated by those of ordinary skill in the art, these apertures 28 should be oriented so as to propel water vapor tangentially about the circumference of the boiler tower 26, thereby facilitating formation within the chamber 21 of the desired counterclockwise vortex 25. In this manner, Coriolis capture is enhanced. Similarly, the air intake assembly 23 generally joins the vortex chamber 21 at a plurality of angled openings 29, which are preferably uniformly spaced about the chamber's cylindrical side wall 70 and angled to direct the inflow of air into the counterclockwise flow about the interior circumference of the chamber 21. In this manner, airspeed is enhanced, further contributing to the overall energy of the system.

Referring now to FIGS. 1 and 2, the water intake assembly 22 is shown to generally comprise a large floating inlet 30, for the collection of massive quantities of water from the alluvion 31 of a shallow ocean bay, and an intake duct 32, for conveyance of the collected water to the vortex chamber 21. Floating inlet 30 and intake duct 32 are preferably black to collect solar radiation and thereby aid in heating of the water taken into the intake duct. Inlet 30 may rest just beneath the surface to further aid in pre-heating the water.

In order to promote vaporization of the collected water, a plurality of pre-heaters are provided along the duct 32. The pre-heaters 33 preferably utilize solar energy to heat the water, thereby avoiding the consumption of fossil fuels. To this end, the pre-heaters 33 of the preferred embodiment of the present invention comprise compound parabolic reflectors arranged to focus sunlight upon black energy-absorbing bodies through which the collected water is routed. In order to ensure adequacy of the solar pre-heaters 33, the inlet 30 of the intake assembly 22 is adapted to draw water from only the top several, warmest inches of the alluvion 31. Those of ordinary skill in the art will recognize that there are many substantially equivalent implementations for water vaporization, including the use of geothermal and nuclear energy sources in place of, or in addition to, solar heaters.

Figure 4:
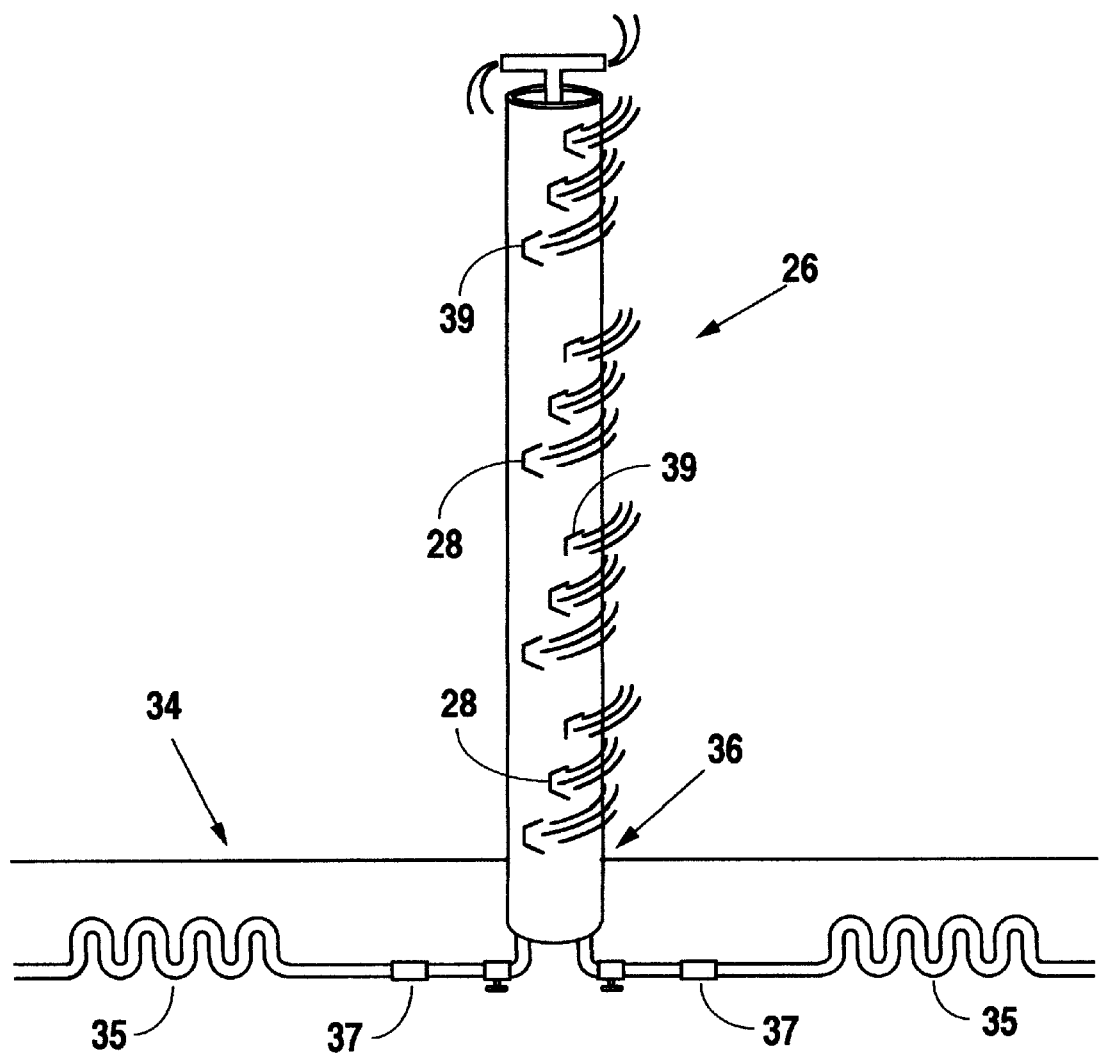
FIG. 4 shows, in a perspective view, details of the boiler tower of the generator of FIG. 1.

As previously discussed, the heated water intake assembly 22 terminates within the vortex chamber 21 at a boiler tower 26, shown in FIG. 4. Because it is necessary that the water entering through the boiler tower 26 comprise a superheated vapor in order to initiate and sustain the hurricane-like qualities of the desired vortex 25, a boilerplate 34, comprising a plurality of heating elements 35, is preferably provided at the base 36 of the boiler tower 26.

Preheated water from the water intake assembly 22 is passed through the heating elements 35, which may comprise further compound parabolic reflectors arranged to focus sunlight upon black energy-absorbing bodies, as utilized in the water intake assembly 22, where the water is heated to a boil. As with the pre-heater, these heating elements may be powered by other conventional energy sources, including geothermal and nuclear energy sources. Additionally, the base 36 of the vortex chamber 21 is preferably located below sea level. In this manner a siphon effect may be utilized in lieu of a mechanical pump to draw water from the alluvion 31, thereby conserving energy.

As detailed in FIG. 4, one or more expansion valves 37, interposed in the fluid flow between the boilerplate 34 and the boiler tower 26, are then utilized to automatically control the injection of the resultant superheated steam through the boiler tower 26 and into the vortex chamber 21. In this manner, the introduction to the vortex chamber 21 of insufficiently heated vapor, which, as will be appreciated by those of ordinary skill in the art, may disrupt formation of the controlled vortex 25, is prevented. Finally, as also previously discussed, the superheated water vapor is delivered to the interior 38 of the vortex chamber 21 through a plurality of apertures 28, which preferably comprise venturi nozzles 39 and are positioned and directed to impart the desired counterclockwise spin upon the injected spray of superheated steam.

Referring now to FIGS. 1 through 3, the air intake assembly 23 is shown to generally comprise an air plenum 40, for capturing and directing toward the vortex chamber 21 of coastal winds, and an expansion chamber 41. As will be better understood further herein, the expansion chamber 41 provides for the creation of a low pressure zone, which lowers the boiling point of the vapor and prevents condensation. In this low pressure zone, large amounts of water vapor mass may be readily introduced into the to airflow. Additionally, as also will be better understood further herein, the expansion chamber 41 contributes to the orientation within the vortex chamber 21 of the resultant high speed, low pressure humid airflow. A turbine chamber 42 is preferably interposed in the airflow between the air plenum 40 and the expansion chamber 41 for the generation of electricity through the adaptation for implementation with the present invention of principles of electrical generation otherwise known to those of ordinary skill in the art. Finally, as will also be better understood further herein, the desired controlled vortex 25 is unimpeded by the turbines, which are placed outside the vortex in an air intake assembly 23 adapted to produce high pressure at the turbine without affecting the vortex.

As shown in the figures, the air plenum 40 is shaped to capture a relatively large cross-section of the ambient breeze and, thereafter, compress and direct the captured airflow into the turbine chamber 42. In order to effect control over the amount of airflow captured, even under widely varying weather conditions, the mouth 43 of the air plenum 40 preferably comprises an adjustable frame 44. The adjustable frame 44 may be raised or lowered to admit through the mouth 43 more or less wind, as required for formation and maintenance within the vortex chamber 21 of the controlled vortex 25. Additionally, one or more hingedly attached guides 45 may be provided at the sides of the mouth 43 to further control the admission of winds to the air plenum 40. Finally, a plurality of guy wires 46 may be provided to enable the capture of winds up to and in excess of 45 miles per hour strength.

To impart initial direction to the captured airflow, which may be extremely turbulent, the floor 47 of the air plenum 40 preferably comprises a series of corrugations 48. As particularly shown in FIGS. 1 and 3, these corrugations 48 are aligned to direct the captured airflow toward the turbine chamber 21. Because it is desirable for formation within the vortex chamber 21 of the controlled vortex 25 that the introduced air be heated, the corrugated floor 48 preferably comprises black energy-absorbing material. Those of ordinary skill in the art, however, will recognize that other materials may also be utilized to produce the desired effect. To this end, the non-structural portions of the remainder of the entire air intake assembly 23 comprise a transparent material through which the radiant energy of the sun may pass. As will be appreciated by those of ordinary skill in the art, the solar energy incident upon the corrugations 48, which comprise greater surface area than would a planar floor, serves to heat the air passing thereover. Finally, because the coastal winds may shift beyond the realm of adjustment of the adjustable frame 44 and guides 45, a track system 49 is provided upon which the entire air plenum 40 may be translated about a flexible junction 53 as necessary for maximum wind capture.

As is apparent, the air intake plenums 40 may be tuned in a variety of ways for increased efficiency and power of the turbine and vortex generator. Among other ways, the inlet size may be changed by manipulating adjustable frame 44, as described above. In addition, sails or guides 45 may be adjusted to better direct onshore breezes into air plenum 40. Also, the speed and load of turbine 50 is adjustable. It is also possible to adjust the solar energy admitted through the top of the air intake assembly. In addition, adjustment to the spin and density of water vapor in air expansion chamber 41 may also be accomplished, as discussed below, to obtain different operating characteristics of the air intake assembly.

Air intake plenums 40 are preferably also equipped with a plurality of sensors to detect various physical properties of the air and water vapor in the air intake assembly. Airspeed sensors, pressure sensors, and ambient wind directions sensors are all well-known to those skilled in the art, and they may be advantageously disposed in the air intake assembly and elsewhere in generator 20 for observation and tuning of performance. For example, airspeed detectors may be employed in air intake plenum 40, vortex chamber 21, conduction tubes 24, and in the fan of turbine 50. Also, water temperature sensors may be employed in vortex chamber 21, in conduction tube 24, proximate boilerplate 34, and proximate floating inlet 30. Similarly, barometric pressure may be sensed in expansion chamber 41. The output from these sensors is also preferably communicated to a central processor which may be programmed to automatically compensate for changes in atmospheric conditions, regulate and maximize Coriolis capture, and regulate the overall efficiency of generator 20. The central processor (not shown) also preferably adjusts flow rates at floating inlet 30, temperature of boilerplate 34, configuration of air intake plenums 40, and steam concentration in expansion chamber 41 and boiler tower 26.

As shown in FIGS. 1 through 3, the turbine chamber 42 generally comprises a turbine 50 having a plurality of vanes 51 connected to a standard electric generator 52. Because the turbine chamber 42 comprises the smallest cross-sectional portion of the air intake assembly 23, the resulting airflow is denser and travels at a higher velocity through the turbine, thereby imparting the greatest possible kinetic energy to the vanes 51 of the turbine 50 and generating electrical power. The generator may be augmented by an automatic transmission means for adapting the speed of the generator to the varying velocity of the incoming ocean breezes. The electricity generated at this stage of the present invention may then be exported for consumption or, in the alternative, may be utilized as required to aid in the heating of the water introduced through the water intake assembly 22 to the vortex chamber 21.

The turbine 50 is advantageously positioned outside the vortex chamber 21 so as not to impede the vortex developed in the chamber. In this manner, part of the total energy of the system is used to drive the turbine 50 and generator electrical power without obstructing the development and maintenance of the natural hurricane within vortex chamber 21. Prior art systems such as those shown in the Bliamptis and Anderson patents, fail to appreciate the advantages of positioning the turbine remotely from or before the vortex chamber. In this prior art systems, the turbines induce the development of back pressure within the vortex, which detracts from the energy of the vortex and tends to decrease the overall efficiency of the system.

The turbine chamber 42 communicates the captured airflow to the expansion chamber 41, which serves to create a low pressure zone for the introduction of vapor mass and to rotate the humidified airflow into a counterclockwise spin for delivery to the vortex chamber 21. In operation, expansion chamber 41 twists and imparts spin to the water vapor, simultaneously increasing the energy of the water vapor and increasing capture of the Coriolis forces. An expansion vane 54, which is oriented to impart the desired counterclockwise spin upon the airflow, is preferably also utilized for the delivery to the expansion chamber 41 of heated water vapor. To this end, the expansion vane 54 is provided with an integral steam pipe 55 having a plurality of openings 56 along the expansion vane 54. The heated water vapor may originate from any of a number of sources such as, for example, the boilerplate 34, the water intake assembly pre-heaters 33 and/or from separately provided pumps and heaters powered by the turbine.

As described above, the location of turbine chamber 42 outside the vortex chamber 21 allows the turbines to work efficiently without a damming effect of a high-pressure environment. In particular, expansion chamber 41 allows the air to be "stretched out" behind turbine chamber 42 so that operation of turbine 50 does not create a high-pressure zone. Thus, the vortex is not inhibited by high pressure, as would be more likely to occur if the turbine were positioned inside or after vortex chamber 21.

As previously discussed, the expansion chamber 41 provides a low pressure zone for the introduction to the generator 20 of additional vapor mass, desirable for increasing the energy of the overall system. The low pressure zone is critical, however, to allow for the development of supersaturated, super-heated water vapor micro-droplets without condensation, thereby permitting more mass and energy to be held aloft to better harness the Coriolis forces.

Figure 5:
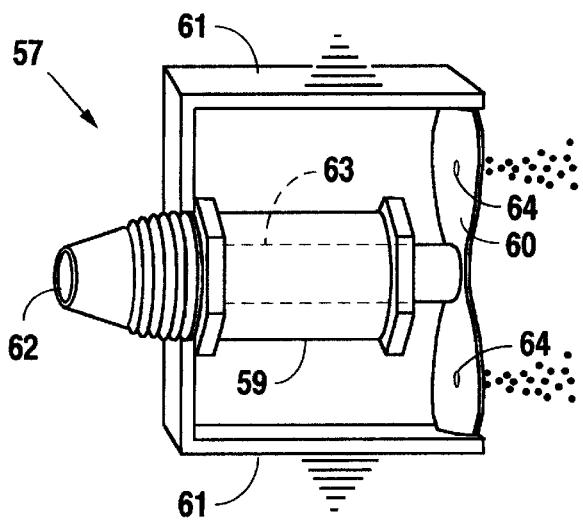
FIG. 5 shows, in perspective view, details of an impeller as utilized in at least one preferred embodiment of the present invention to nebulize water molecules entering the vortex chamber.
Figure 6:
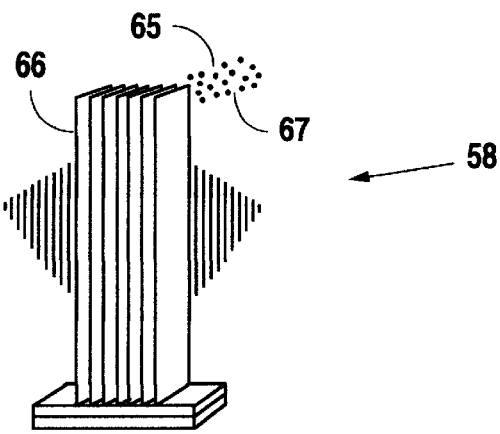
FIG. 6 shows, in perspective view, details of a sonic transducer as utilized in one embodiment of the present invention to nebulize water molecules entering the vortex chamber.

For the maintenance and formation of the controlled vortex 25, it is also desirable to introduce the micro-droplet vapor mass without disrupting of the high speed airflow. To this end, additional devices may be integrated into the steam pipe 55 and/or expansion vane 54 to facilitate conversion to steam of the water injected therethrough. For example, as shown in FIGS. 5 and 6, respectively, sonic impellers 57 and/or sonic transducers 58 may be utilized to nebulize the steam as it is injected into the expansion chamber 41. The Coriolis forces are better able to act on the smallest-size water droplets, making it desirable to produce the largest number of micro-droplets possible. These micro-droplets are most susceptible to the Coriolis forces and can thereby introduce the greatest amount of momentum into the spinning vortex.

Referring now to FIG. 5, such a sonic impeller 57 is shown to generally comprise a threaded body 59, having dependently attached thereto a magnetic rotor 60, and a plurality of permanent magnets 61. The threaded body 59 mates with corresponding threads in the openings 56 from the steam pipe 55. The heated water, forced through the steam pipe 55, enters an inlet port 62 on the threaded body 59 and is directed through a cavity 63 in the body 59 into and through orifices 64 on the magnetic rotor 60. Exit of the water from the magnetic rotor 60, propels the rotor 60 through the magnetic field created by the permanent magnets 61. As the rotor 60 spins in this field, vibrations are created at a frequency corresponding to the dipolar moment of a water molecule, resulting in the desired nebulization of the water molecules. In this manner, the water is essentially boiled with magnetic energy. Similarly, as shown in FIG. 6, the stream 65 of water may be passed through, or in close proximity to, a plurality of vibrating panels 66. When the vibration of the panels 66 is optimized to the proper frequency, the stream 65 of water will be converted into a gaseous spray 67.

In any case, the heated and humidified airflow through the expansion chamber 41 is finally delivered to the vortex chamber 21 for formation, with the superheated vapor introduced from the water intake assembly 22, of the desired controlled vortex 25. While necessary to direct the airflow into the counterclockwise spin within the vortex chamber 21, care should be taken to ensure that the flow is not disrupted. To this end, screens or other obstructions should be avoided at this point in the airflow. Preferably, each expansion chamber 41 terminates in a simple angled opening 29 to the vortex chamber 21 with no sharp corners or the like.

Referring again to FIGS. 1 and 3, the vortex chamber 21 of the present invention is shown to generally comprise an inner wall 69 and an outer wall 70 surrounding and enclosing the boiler tower 26 and supported upon a structurally sound, adjustable framework. Each wall preferably comprises a transparent material, which together form a convex lens 72 in order that the radiant energy of the sun may be focused in the interior 38 of the vortex chamber 21. Additionally, in order to enable adjustment of the vortex chamber 21 to the ambient conditions, each wall comprises a flexible material. In this manner, the height of the chamber as well as its diameter may be controlled in order to facilitate formation and maintenance of the desired vortex 25. Preferably, the interior space 73 between the inner wall 69 and the outer wall 70 is provided with an inert gas, thereby preventing loss of heat energy from within the vortex chamber 21.

As the superheated vapor, from the water intake assembly 22, and the heated and humidified airflow, from the air intake assembly 23, enter and rise toward the top of the vortex chamber 21, the earth's Coriolis effect imparts further momentum to their counterclockwise spin in order to produce high speed winds with hurricane-like qualities. The physical laws of conservation of angular momentum impart both initial motion and continuity of motion to the superheated vapor. Thus, relatively little non-natural energy input is required to maintain the vortex, or quasi-hurricane. These captured winds may then be utilized for the direct generation of electric power or, in the alternative, may be utilized to propel the moisture captured therein over great distances for later conversion through known hydroelectric power systems. Additionally, because the winds generated within the chamber 21 may reach in excess of 200 miles per hour strength and charges are separated from the evaporated water, electrostatic discharges may be expected within the vortex chamber 21. To this end, electrodes 74 may be strategically placed within the vortex chamber 21 and conduction tubes 24 for capture and conversion of this capacitive energy.

As shown in FIGS. 1 through 3, the vortex chamber 21 further comprises an exit chamber 75 at the upper portion thereof for communication of the moisture-laden winds a remote site. As shown in the figures, the exit chamber 75 is designed to maintain a laminar flow as the vortex 25 enters the chamber 75. The flow is then communicated into one or more conduction tubes 24 through which the water vapor may be carried at a high rate of speed up to several miles distant. As shown, the conduction tubes 24 may terminate in a relatively higher altitude storage reservoir 76, or the like, where the condensed vapor may later be converted to hydroelectric power. In order to facilitate communication over greater distances, however, the conduction tubes 24 are provided with specific adaptations designed to maintain both the vaporized state and the speed of the flow.

Figure 7:
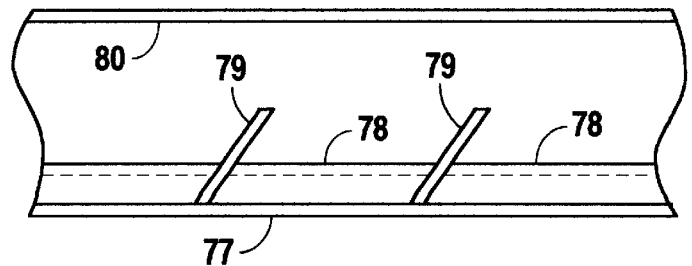
FIG. 7 shows, in a partially cut away elevational view, the conduction tube of the generator of FIG. 1 and, in particular, details of the various structures preferably implemented within the conduction tube.

In particular, as shown in FIG. 7, the lower portion 77 of each conduction tube 24 comprises a plurality of black energy-absorbing corrugated areas 78 separated by check vanes 79, while the upper portion 80 of each conduction tube 24 comprises a translucent surface 81. In this manner, any condensate that forms in the conduction tubes 24 may be re-vaporized by the radiant energy of the sun against the corrugations 78 and, thereafter, rejoin the flow through the conduction tube 24. The check vanes 79 serve to ensure that, as the condensate vaporizes and expands, flow is maintained in the desired direction toward the storage reservoir 76, and water cannot flow backward in the conduction tube.

Figure 8:
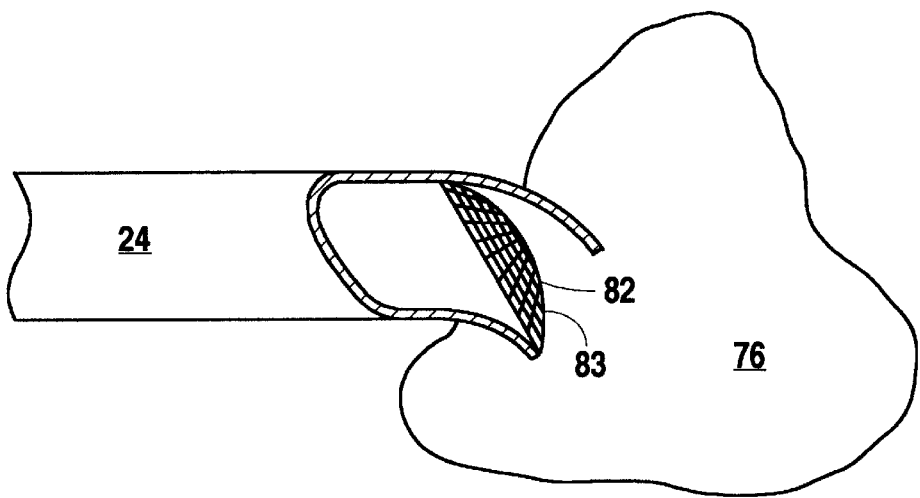
FIG. 8 shows, in a partially cut away perspective view, details of the termination of the conduction tube at a remote reservoir.

As shown in FIG. 8, each conduction tube 24 is provided at a point near the storage reservoir 76 with a precipitation screen 82 designed to allow the vapor to return to its liquid state. The precipitation screen 82 further comprises a plurality of capillary pipettes 83, which serve to pull upstream vapor through the conduction tubes 24 through a siphoning action as the condensed water drains downward into the storage reservoir 76. Once collected at the higher elevation storage reservoir 76, the massive quantities of water propelled through the generator 20 of the present invention may then be converted to electrical energy through known hydroelectric methods or utilized for other consumption as desired.

Figure 9:
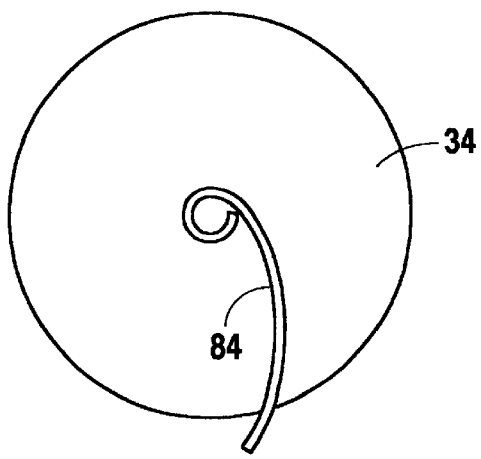
FIG. 9 shows, in a top plan view, the sweeper as utilized in the present invention to harvest mineral precipitates from the vortex chamber.

While the foregoing description is exemplary of the preferred embodiment of the present invention, those of ordinary skill in the relevant arts will recognize the many variations, alterations, modifications, substitutions and the like as are readily possible, especially in light of this description, the accompanying drawings and claims drawn thereto. For example, a sweeper 84, propelled by entering water vapor or by a motor, may be provided in the base 36 of the vortex chamber 21 as shown in FIG. 9 for the scraping therefrom of valuable mineral or organic precipitates. Sweeper 84, in combination with the cleaning effects of evaporation and precipitation in conduction tube 24, provides a means for water and air cleaning and treatment not heretofore available. For example, the treatment of sewage or nuclear waste water treatment is made possible, and those skilled in the art will recognize that other types of water and air may also be treated if desired.

Figure 10:
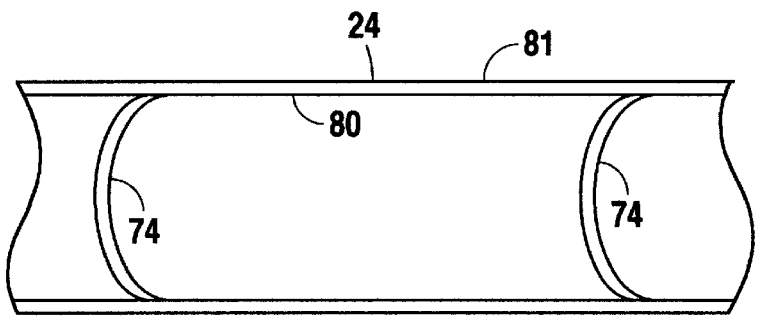
FIG. 10 shows, in a partially cut away elevational view, the conduction tube of the generator of FIG. 1 and, in particular, details of the electrodes preferably utilized within the conduction tube for the capture of electrical discharges from the high-speed flows through the conduction tube.

Additionally, electrodes 74 may be placed within the conduction tubes 24, as shown in FIG. 10, for the capture of electrostatic discharges as the water evaporates and is propelled at high rate of speed therethrough. Similarly, such electrodes may be placed in vortex chamber 21, in any configuration desired, for the capture of any electrostatic discharge there. Electrostatic discharge and capture may also be advantageously used to produce ozone to aid in cleaning contaminants from the water and air introduced into the system.

Still further, the floating inlet 30 may be provided with means for automatic or manual submersion in case of severe weather, thereby preventing damage to generator 20. Those of ordinary skill in the art will also recognize that the present invention may also be implemented inland, in which case a specially modified shallow water bay is preferably provided for the provision to the generator 20 of preheated water. Such a bay could also be provided with a black bottom surface to further promote heating of the water stored therein.

Still further, multiple generators of the type described may be connected in serial fashion to improve efficiency or increase total power output, or as a means of effecting a "relay station" or regenerator. And still further, it will be within the skill of the ordinary artisan to place the inventive system onboard an ocean-going ship to provide electrical power to the ship using the power of the ocean winds and ready availability of ocean water for fueling the system of the present invention. In any case, because the scope of the present invention is much broader than any particular embodiment, the foregoing detailed description should not be construed as a limitation of the scope of the present invention, which is limited only by the claims appended hereto.

What is claimed is:

1. A system for employing the Coriolis effect for the generation of electrical energy, comprising:
    a vortex chamber for rotational acceleration therein of superheated water vapor and heated air;
    a water intake assembly in fluid communication with said vortex chamber, said water intake assembly being adapted to deliver a stream of superheated water vapor to a lower portion of said vortex chamber;
    an air intake assembly in fluid communication with said vortex chamber, said air intake assembly being adapted to deliver a flow of heated air to said lower portion of said vortex chamber; and
    wherein said air intake assembly comprises an electrical generator, said electrical generator being operable by airflow drawn from said air intake assembly into said vortex chamber as said stream of superheated water vapor and said flow of heated air are accelerated within said vortex chamber by the Coriolis effect.

2. The system as recited in claim 1, wherein said electrical generator is located within said air intake assembly.

3. The system as recited in claim 2, wherein said air intake assembly comprises:
    an air plenum having a mouth portion and an interior portion, said mouth portion being open to atmosphere;
    an expansion chamber having an inlet portion and an outlet portion, said outlet portion being in fluid communication with said vortex chamber; and
    a turbine chamber, said turbine chamber comprising a junction of said interior portion of said air plenum with said inlet portion of said expansion chamber.

4. The system as recited in claim 3, wherein said turbine chamber has a cross-sectional area smaller than any other cross-sectional area within said air intake assembly.

5. The system as recited in claim 4, wherein said electrical generator is located within said turbine chamber.

6. The system as recited in claim 3, wherein said air plenum is movable with respect to said expansion chamber.

7. The system as recited in claim 6, wherein said turbine chamber comprises a flexible junction, said flexible junction enabling movement of said air plenum with respect to said expansion chamber.

8. The system as recited in claim 7, wherein said air plenum of said intake assembly is adapted to move along a track.

9. The system as recited in claim 6, wherein said mouth portion of said air plenum comprises an adjustable frame, said adjustable frame being adapted to vary the size of said mouth portion, thereby to vary the airflow to said air intake assembly.

10. The system as recited in claim 3, wherein said outlet portion of said expansion chamber comprises an angled opening into said vortex chamber.

11. The system as recited in claim 10, wherein said angled opening is adapted to impart spin to said flow of heated air as said flow is delivered to said vortex chamber, said spin being consistent with the direction of the Coriolis effect.

12. The system as recited in claim 3, wherein said expansion chamber comprises a vane, said vane being adapted to impart spin to said flow of heated air prior to delivery to said vortex chamber, said spin being consistent with the direction of the Coriolis effect.

13. The system as recited in claim 12, wherein said vane comprises an integral steam pipe, said steam pipe having a plurality of apertures through which said steam pipe is adapted to direct a spray of steam into said expansion chamber.

14. The system as recited in claim 13, wherein each said aperture is provided with a nebulizing device.

15. The system as recited in claim 14, wherein said nebulizing device comprises a sonic impeller.

16. The system as recited in claim 14, wherein said nebulizing device comprises a sonic transducer.

17. The system as recited in claim 3, wherein said water intake assembly comprises a floating inlet, said floating inlet being adapted to direct alluvion into said vortex chamber.

18. The system as recited in claim 17, wherein said floating inlet is selectively submersible for protection against severe weather.

19. The system as recited in claim 17, wherein said water intake assembly further comprises an intake duct, said intake duct providing fluid communication between said floating inlet and said vortex chamber.

20. The system as recited in claim 19, wherein said intake duct comprises a plurality of solar pre-heaters, each said solar pre-heater being adapted to heat water collected through said floating inlet as the water is communicated to said vortex chamber.

21. The system as recited in claim 17, wherein said vortex chamber comprises a boiler tower substantially centrally located in said lower portion, said boiler tower being adapted to control introduction to said vortex chamber of said stream of superheated water vapor.

22. The system as recited in claim 21, wherein said boiler tower comprises a plurality of apertures through which said stream of superheated water vapor is delivered to said vortex chamber, each said aperture being oriented to direct said stream in a rotational flow within said vortex chamber, the direction of said rotational flow being consistent with the direction of the Coriolis effect.

23. The system as recited in claim 22, wherein each said aperture comprises a venturi nozzle.

24. The system as recited in claim 22, wherein said boiler tower comprises a boiler plate in a lower portion thereof, said boiler plate being adapted to heat water from said floating inlet thereby producing superheated water vapor for delivery to said vortex chamber.

25. The system as recited in claim 24, wherein said boiler tower further comprises a sweeper adjacent said boiler plate, said sweeper being adapted to harvest precipitates from said boiler plate.

26. The system as recited in claim 25, wherein said sweeper is steam propelled.

27. The system as recited in claim 25, wherein said sweeper is motor driven.

28. The system as recited in claim 17, wherein said vortex chamber comprises an exit chamber in an upper portion of said vortex chamber, said exit chamber being adapted to provide a substantially laminar exit from said vortex chamber for the rotationally accelerated superheated water vapor and heated air.

29. The system as recited in claim 28, said system further comprising a conduction tube in fluid communication with said exit chamber for conveyance of water vapor and air to a remote location.

30. The system as recited in claim 29, wherein said conduction tube comprises a plurality of corrugations for collection within said conduction tube of condensed water vapor.

31. The system as recited in claim 30, wherein at least an upper portion of said conduction tube comprises a translucent material for transmission of solar energy into said conduction tube.

32. The system as recited in claim 31, wherein said corrugations comprise an energy absorbing composition such that solar energy transmitted into said conduction tube tends to cause evaporation of any condensed water vapor collected by said corrugations.

33. The system as recited in claim 29, wherein said conduction tube comprises a plurality of check vanes adapted to direct flow of water vapor and air within said conduction tube toward the remote location.

34. The system as recited in claim 29, wherein said conduction tube comprises a precipitation screen in a terminal portion thereof, said precipitation screen being adapted to cause condensation of water vapor prior to exhaust from said conduction tube.

35. A system for employing the Coriolis effect for the collection of natural energy, said system comprising:

a vortex chamber for rotational acceleration therein of superheated water vapor and heated air;

a water intake assembly in fluid communication with said vortex chamber, said water intake assembly being adapted to deliver a stream of superheated water vapor to a lower portion of said vortex chamber;

an air intake assembly in fluid communication with said vortex chamber, said air intake assembly being adapted to deliver a flow of heated air to said lower portion of said vortex chamber;

an exit chamber leading to a conduction tube, said exit chamber being located in an upper portion of said vortex chamber; and wherein said exit chamber is adapted to provide a substantially laminar exit from said vortex chamber for the rotationally accelerated superheated water vapor and heated air.

36. The system as recited in claim 35, wherein said air intake assembly comprises an electrical generator, said electrical generator being operable by airflow drawn from said air intake assembly into said vortex chamber as said stream of superheated water vapor and said flow of heated air are accelerated within said vortex chamber by the Coriolis effect.

* * * * *